(12) United States Patent
Ryan

(10) Patent No.: US 7,178,665 B2
(45) Date of Patent: Feb. 20, 2007

(54) CONVERTING A PRE-EXISTING CONVEYOR FRAME INTO A BELT CONVEYOR

(75) Inventor: Robert S. Ryan, Lansdale, PA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 10/907,981

(22) Filed: Apr. 22, 2005

(65) Prior Publication Data

US 2006/0237292 A1 Oct. 26, 2006

(51) Int. Cl.
*B65G 21/08* (2006.01)

(52) U.S. Cl. .................... 198/860.1; 198/836.1

(58) Field of Classification Search ............ 198/836.1, 198/836.3, 860.1, 860.2, 861.1
See application file for complete search history.

(56) References Cited

U.S. PATENT DOCUMENTS

| 4,724,953 | A | * | 2/1988 | Winchester | ............... 198/836.3 |
| 5,316,134 | A | * | 5/1994 | Donohue | ................. 198/861.1 |
| 5,447,224 | A | * | 9/1995 | Gebhardt | ................. 198/861.1 |
| 5,762,178 | A | | 6/1998 | Tarlton | ..................... 198/860.2 |
| 6,378,695 | B1 | | 4/2002 | Rinne | ....................... 198/863.3 |
| 6,698,580 | B2 | | 3/2004 | Diego | ......................... 198/588 |
| 6,848,572 | B1 | * | 2/2005 | Sisson et al. | ............ 198/860.1 |
| 7,000,759 | B1 | * | 2/2006 | Jones | ....................... 198/841 |
| 2004/0262120 | A1 | | 12/2004 | LeCroy | ....................... 193/30 |

* cited by examiner

*Primary Examiner*—James R. Bidwell
(74) *Attorney, Agent, or Firm*—James T. Cronvich

(57) ABSTRACT

A kit and associated methods for converting a pre-existing conveyor frame into a belt conveyor. The converted conveyor comprises a U-shaped pan mounted to the top of a pre-existing conveyor frame. The U-shaped pan has a pair of side walls flanking a base. A carryway is fastened to the base of the pan to support a modular conveyor belt. Liners extending from the top of the side walls extend into the pan to act as low-friction side rails. Inverted-U-shaped guides attached to the bottom portion of the pre-existing frame at periodically spaced frame supports guide the belt in the returnway beneath the carryway. Spacers interposed between the frame supports and the frame provide vertical and lateral clearance for the belt along the returnway. The kit provides parts for converting a pre-existing conveyor frame into a belt conveyor.

20 Claims, 3 Drawing Sheets

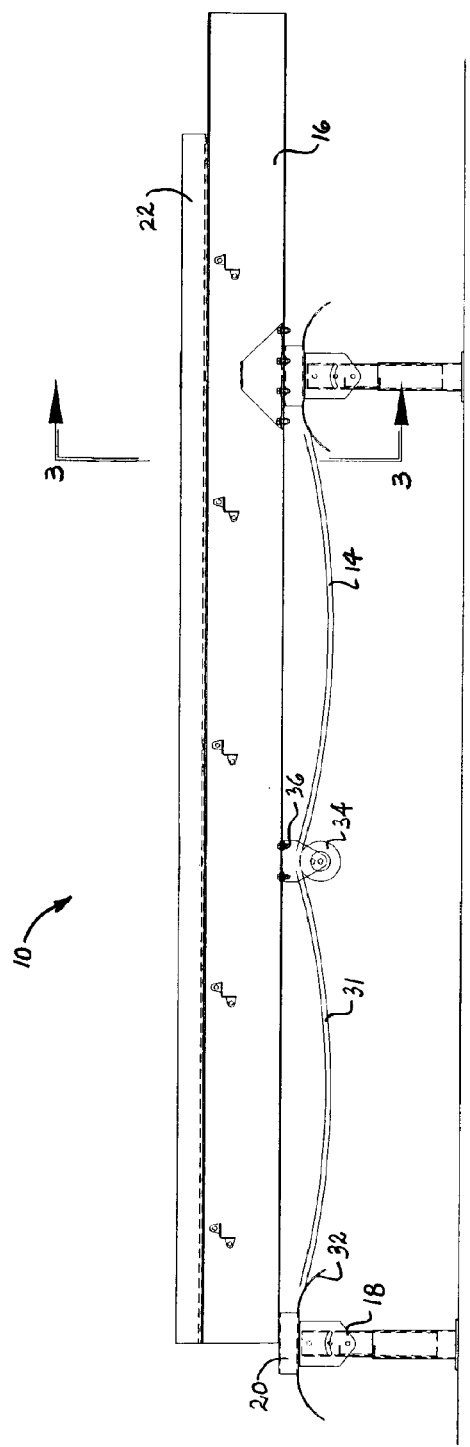
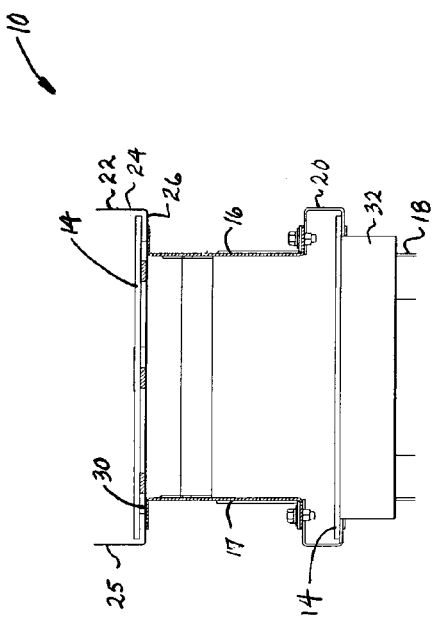
FIG. 2
FIG. 3

CONVERTING A PRE-EXISTING CONVEYOR FRAME INTO A BELT CONVEYOR

BACKGROUND

The invention relates to a belt conveyor converted from a pre-existing belt- or roller-conveyor frame, a kit for performing the conversion, and a method for performing the conversion.

Many kinds of conveyors are used in industrial settings to transport articles. Roller conveyors, for example, consist of an array of metal rollers arranged side by side along the length of a conveyor frame. The ends of the rollers are retained in opposite sides of the conveyor frame. The rollers rotate about axes directed widthwise across the conveyor perpendicular to the conveyance direction. The rollers may be passive, but are commonly driven to rotate by a drive belt. The width of the conveyor frame is fixed to accommodate the axial length of the rollers. Roller conveyors work well, but are notoriously noisy and often require repair. As another example, flat belt conveyors are also commonly used to transport articles. These conveyors include flat rubber or fabric belts tensioned between drive and idler pulleys at opposite ends. But a flat belt can drift to one side of the pulleys and stretch over time. If it tears, the belt must be removed from the conveyor, the torn section cut out, and a new section spliced in.

Because of the shortcomings of roller conveyors and flat belt conveyors, it is often desirable to replace them with modular plastic belt conveyors. Furthermore, it is often desirable to widen a conveyor to handle more product. But converting to a modular belt conveyor from a roller conveyor, a flat belt conveyor, or a modular belt conveyor of a different width is usually a time-consuming and costly operation. The conversion is difficult mainly because conveyor frames are typically designed to accommodate the rollers or the belt they were originally specified to be used with. That's why the width of a conveyor is usually fixed.

Thus, there is a need for a simple means for converting a pre-existing conveyor frame into a conveyor that runs a modular conveyor belt of a variety of widths—even widths greater than the width of the pre-existing conveyor frame.

SUMMARY

This need and other needs are satisfied by a belt conveyor embodying features of the invention. The belt conveyor starts with a pre-existing conveyor frame that extends in length from a first end to a second end, in width from a first side to a second side, and in height from a top to a bottom. Support frames are positioned along the bottom at spaced apart locations along the length of the conveyor frame. At least one U-shaped pan is mounted at the top of the pre-existing conveyor frame. The U-shaped pan includes a pair of side walls flanking a base. A carryway that extends the length of the conveyor frame is fastened to the base of the U-shaped pan. A modular conveyor belt, which is constructed of articulated rows of individual belt modules, is connected into a loop, a portion of which is supported at a level atop the carryway.

In another aspect of the invention, a kit is provided to convert a pre-existing conveyor frame into a belt conveyor. The kit includes at least one U-shaped pan and carryway elements. The U-shaped pan, which is suitable for mounting to the pre-existing conveyor frame, includes a pair of side walls flanking a base. Openings are formed through the base. The carryway elements may be fastened to the pan through the openings in the base between the pair of side walls to support a length of conveyor belt in a carryway at a level in the U-shaped pan.

In yet another aspect of the invention, a method for converting a pre-existing conveyor frame into a belt conveyor comprises: mounting at least one U-shaped pan atop a pre-existing conveyor frame; fastening a carryway to the base of the U-shaped pan; and laying a first portion of a conveyor belt atop the carryway at a level in the U-shaped pan.

BRIEF DESCRIPTION OF THE DRAWINGS

These features and aspects of the invention, as well as its advantages, are better understood by reference to the following description, appended claims, and accompanying drawings, in which:

FIG. 2 is a side elevation view of the converted conveyor of FIG. 1;

FIG. 3 is a cross section of the converted conveyor of FIG. 1 taken along lines 3—3 of FIG. 2.

DETAILED DESCRIPTION

Figure 1:
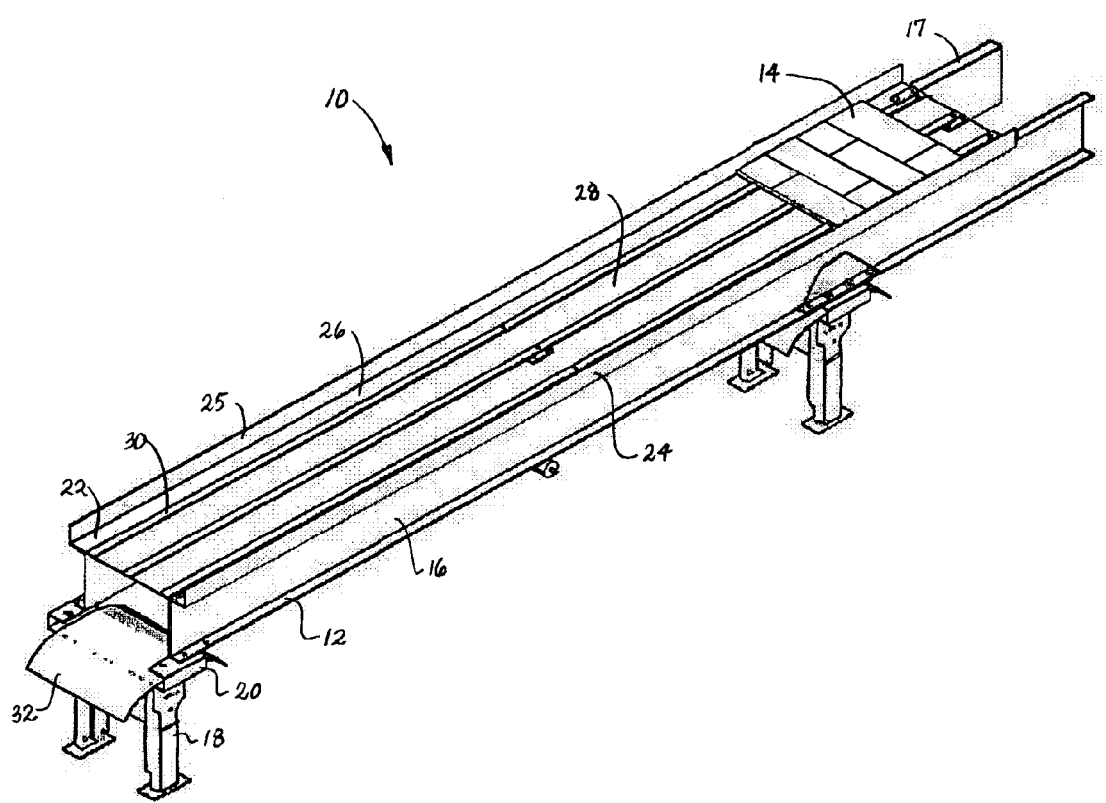
FIG. 1 is an isometric view of a portion of a conveyor frame converted into a belt conveyor according to the invention.

One version of a conveyor embodying features of the invention is shown in FIGS. 1–3. The conveyor 10 has been modified from a pre-existing conveyor frame 12 to accommodate a modular conveyor belt 14. The pre-existing conveyor frame 12, which is typical of roller conveyor frames and flat belt conveyor frames, includes sides 16, 17 supported at intervals along the length of the conveyor by support frames, such as leg supports 18. The sides of the conveyor frame are mounted on the support frames. The width of the conveyor, defined by the separation of the two sides of the conveyor frame, is set by the specifications of the original conveyor. For example, if the original conveyor were a roller conveyor, the sides would be spaced apart enough to receive the axial ends of the rollers. In a typical installation, the conveyor width is fixed and is not readily adjustable.

One way to adapt such a fixed-width conveyor frame to accept a modular belt of the same or a different width is by mounting a U-shaped pan 22 atop or within the pre-existing conveyor frame. The pan has two opposite side walls 24, 25 flanking a base 26. Although a single pan may extend the entire length of the conveyor, a series of U-shaped pans are preferably mounted serially along the length of the pre-existing conveyor frame. The U-shaped pans may be pre-cut to convenient lengths, such as lengths equal to the spacings between consecutive leg supports. A carryway 28, formed, in this example, by three carryway elements, UHMW wear-strips 30, fastened to the base of the pan, supports the modular conveyor belt 14 along the top of the conveyor. The width of the base of the U-shaped pan is sized to accommodate the width of the belt to be used, which may provide a conveying surface wider than that of the original conveyor.

Although not shown, the belt is conventionally trained between drive and idler sprocket sets or drums at opposite first and second ends of the conveyor. Thus, the belt forms an endless loop. The drive and idler sprocket sets, their associated shafts, and motor on the drive shaft are preferably arranged as drop-in units for installing readily conveyor frame to convert it to accommodate a modular belt. The belt returns along a returnway 31 in the bottom portion of the conveyor frame below the carryway. Spacers 20, in the form of brackets interposed between and connected to the walls 16, 17 and the leg supports 18, provide vertical and lateral clearance for the belt return. To guide the belt past the frame supports, inverted-U-shaped guides 32, in the form of curved metal sheets, are mounted atop the leg supports 18. The curved surface of the guides leads the belt in the returnway over the leg supports. The guides and the spacers may be formed unitarily in a single piece or may be separate pieces. If the leg supports are spaced far apart, a return roller 34 may optionally be mounted to flanges 36 fastened to the conveyor frame to reduce catenary sag. The belt, after being positioned on the carryway and wrapped around the sprockets, is threaded over the inverted-U-shaped guides and optional return rollers defining the returnway.

Figure 4A:
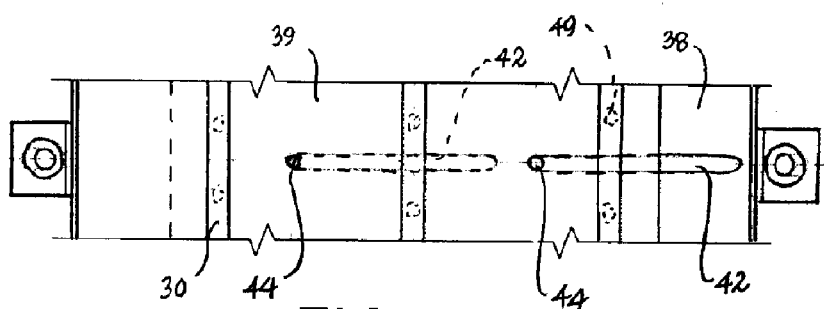
FIGS. 4A and 4B are a top plan view and a front elevation cross sectional view of another version of conveyor embodying many of the features of the conveyor of FIG. 1 and a width-adjusting feature.
Figure 4B:
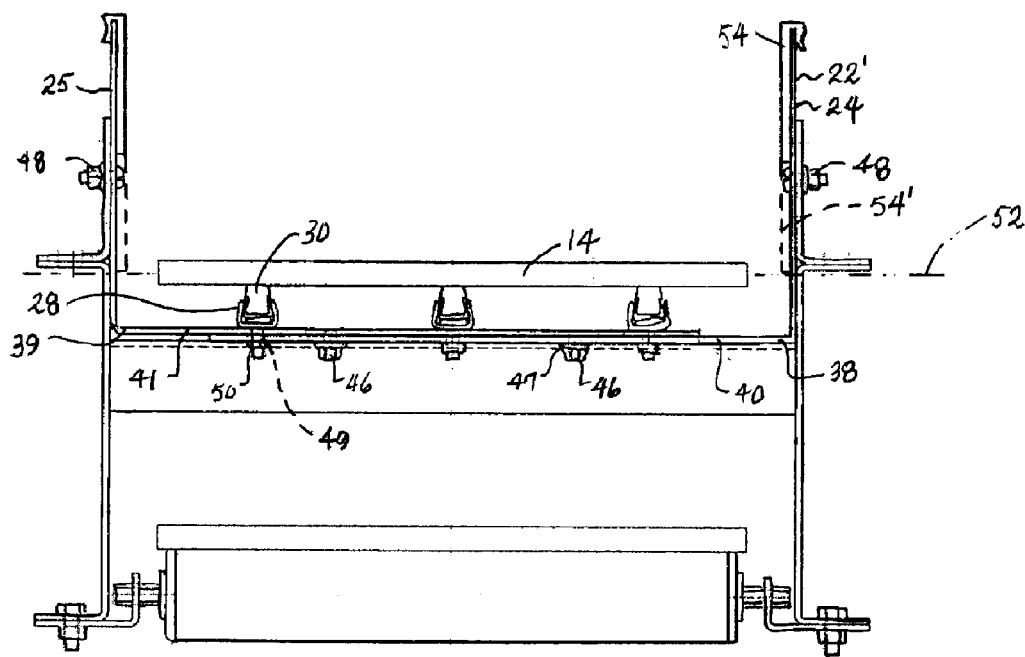

The U-shaped pan 22 is shown in FIGS. 1–3 as having a fixed width. A width-adjustable pan 22' is shown in FIGS. 4A–B. The U-shaped, width-adjustable pan is formed of two L-shaped sections 38, 39. The first section 38 forms one of the side walls 24 and a base portion 40 extending perpendicularly inward from the bottom of the side wall. Slots 42 elongated in the widthwise direction of the conveyor are formed in the base portion. The second L-shaped section 39 is shaped similar to the first section and forms the other side wall 25 and a base portion 41 that overlaps the base portion 40 of the first L-shaped section. Holes 44 formed in the base portion of the second L-shaped section align with the slots in the other section. The holes may be threaded. Fasteners, such as bolts 46 with lock washers 47, may be run through the slot into the threaded holes. The two L-shaped sections may be pushed toward or away from each other along the slots to the desired width. If the desired width happens to be less than the width of the original conveyor frame, the width-adjustable pan can be recessed into the conveyor frame, rather than mounted on top. The side walls can be affixed to the sides of the pre-existing conveyor by fasteners 48, for example.

The carryway 28 includes, in this example, three linear wear strips 30 mounted to the base through openings 49 by fasteners 50, such as nuts and bolts. The conveyor frame 14 can then be laid atop the wear strip at a level 52 in the carryway. A liner, or edge guide 54, extends from the top of the side walls 24, 25 down into the carryway along the side walls to provide low-friction side rails that prevent conveyed articles from scuffing as they rub on the rail. The liner can optionally be extended 54' to or below the level 52 of the conveyor belt to prevent the belt from catching on the bottom edge of the rail.

Thus, a kit that may be used to convert a pre-existing conveyor frame into a conveyor for a modular belt includes one or more U-shaped pans and carryway elements for fastening to the base of the U-shaped pans. Fasteners may be extended through openings in the base to attach the carryway to the pan. A modular belt could be added to the kit for mounting in the converted conveyor. The kit could also include a liner as described or spacers with or without inverted U-shaped guides for use in the returnway. The U-shaped pans could alternatively be realized as pairs of L-shaped pan sections slotted for adjustability.

Thus, the invention has been described with reference to a few preferred versions, but other versions are possible. For example, the carryway could be realized as a flat sheet covering most of the base of the pan or could be wearstrips arranged in a chevron pattern. As another example, fasteners other than nuts and bolts, such as rivets, weldments, and so on, could be used to attach parts together. So, as these few examples suggest, the scope of the claims is not meant to be limited to the preferred versions described in detail.

What is claimed is:

1. A belt conveyor converted from a pre-existing conveyor frame to accommodate a modular conveyor belt, the belt conveyor comprising:
    a pre-existing conveyor frame extending in length from a first end to a second end, in width from a first side to a second side, and in height from a top to a bottom and having support frames at the bottom at spaced apart locations along the length of the conveyor frame;
    at least one U-shaped pan mounted atop the top of the pre-existing conveyor frame, the at least one U-shaped pan including a pair of side walls flanking a base;
    a carryway extending the length of the pre-existing conveyor frame fastened to the base of the at least one U-shaped pan;
    a modular conveyor belt comprising a plurality of articulated rows of individual belt modules connected into a loop, wherein a portion of the loop is supported at a level atop the carryway.

2. A belt conveyor as in claim 1 wherein the base of the at least one U-shaped pan is adjustable in width.

3. A belt conveyor as in claim 1 wherein the at least one U-shaped pan comprises first and second L-shaped pan sections, the first L-shaped pan section forming one of the side walls and including a base portion and the second L-shaped pan section forming the other of the side walls and including a base portion that overlaps in height the base portion of the first L-shaped pan section, wherein the base portion of the first L-shaped pan section includes at least one slot elongated along the width of the pre-existing conveyor frame aligned with a hole in the overlapping base portion of the second L-shaped conveyor pan section to admit a fastener through the overlapping base portions to form a width-adjustable U-shaped pan.

4. A belt conveyor as in claim 1 further comprising a liner extending the length of the pre-existing conveyor frame attached to each of the side walls of the at least one U-shaped pan, the liner extending from the top of each facing side wall to a height at or below the level of the conveyor belt atop the carryway.

5. A belt conveyor as in claim 1 further comprising spacers mounted to the pre-existing conveyor frame at spaced apart locations along the length of the conveyor above the support frames and below the carryway to provide clearance for the modular conveyor belt.

6. A belt conveyor as in claim 5 further comprising inverted-U-shaped guides integrally formed with the spacers to form a belt returnway supported at the guides and between the adapter brackets.

7. A belt conveyor as in claim 1 further comprising inverted-U-shaped guides mounted to the pre-existing conveyor frame at spaced apart locations along the length of the conveyor above the support frames and below the carryway to form a belt returnway supported at the guides.

8. A kit for converting a pre-existing conveyor frame into a belt conveyor, the kit comprising:
    at least one U-shaped pan for mounting to the pre-existing conveyor frame, the at least one U-shaped pan including a pair of side walls flanking a base having openings formed therethrough;

carryway elements adapted to be fastened through the openings in the base to the at least one U-shaped pan between the pair of side walls to support a length of conveyor belt on a carryway at a level in the at least one U-shaped pan;and inverted-U-shaped guides for mounting to the pre-existing conveyor frame at spaced apart locations along the length of the conveyor below the carryway to form a belt returnway supported at the inverted-U-shaped guides.

9. A kit as in claim 8 further comprising fasteners for extending through the openings in the base of the at least one U-shaped pan to attach the carryway elements to the base of the at least one U-shaped pan.

10. A kit as in claim 8 further comprising a modular conveyor belt comprising a plurality of articulated rows of individual belt modules connected into a loop, a portion of which is positionable for support atop the carryway.

11. A kit as in claim 8 wherein the at least one U-shaped pan comprises first and second L-shaped pan sections, the first L-shaped pan section arrangeable to form one of the side walls and including a base portion and the second L-shaped pan section arrangeable to form the other of the side walls and including a base portion for overlapping the base portion of the first L-shaped pan section to form the U-shaped pan, wherein the base portion of the first L-shaped pan section includes at least one slot elongated in a direction generally perpendicular to the side wall and wherein the base portion of the second L-shaped pan section includes at least one hole for adjustable alignment with the at least one elongated slot, and wherein the kit further includes fasteners for extending through the aligned slots and holes to retain the hole at a position along the slot selected to set the separation of the side walls to accommodate the conveyor belt in the U-shaped pan.

12. A kit as in claim 8 further comprising a liner for attaching to each of the side walls of the U-shaped pan to extend from the top of each facing side wall to or below the level of the conveyor belt atop the carryway.

13. A kit as in claim 8 further comprising spacers for mounting to the pre-existing conveyor frame at spaced apart locations along the length of the conveyor above the support frames and below the carryway to provide clearance for the modular conveyor belt.

14. A belt conveyor converted from a pre-existing conveyor frame to accommodate a modular conveyor belt, the belt conveyor comprising:

a pre-existing conveyor frame extending in length from a first end to a second end, in width from a first side to a second side, and in height from a top to a bottom and having support frames at the bottom at spaced apart locations along the length of the conveyor frame;

at least one U-shaped pan mounted at the top of the pre-existing conveyor frame, the at least one U-shaped pan including a pair of side walls flanking a base;

a carryway extending the length of the pre-existing conveyor frame fastened to the base of the at least one U-shaped pan;

a modular conveyor belt comprising a plurality of articulated rows of individual belt modules connected into a loop, wherein a portion of the loop is supported at a level atop the carryway; and inverted-U-shaped guides mounted to the pre-existing conveyor frame at spaced apart locations along the length of the conveyor above the support frames and below the carryway to form a belt returnway supported at the guides.

15. A kit as in claim 8 further comprising spacers unitarily formed with the inverted U-shaped guides for mounting to the pre-existing conveyor frame at spaced apart locations along the length of the conveyor above the support frames and below the carryway to form a belt returnway providing clearance for the modular conveyor belt.

16. A method for converting a conveyor frame into a modular-belt conveyor, comprising:

mounting at least one U-shaped pan to a pre-existing conveyor frame, the at least one U-shaped pan including a pair of side walls flanking a base;

fastening a carryway extending the length of the conveyor to the base of the at least one U-shaped pan;

laying a first portion of a conveyor belt at a level atop the carryway in the U-shaped pan;

mounting inverted-U-shaped guides to the pre-existing conveyor frame at spaced apart locations along the length of the conveyor below the carryway; and threading a second portion of the conveyor belt through the pre-existing conveyor frame atop the inverted-U-shaped guides to form a returnway supported at the guides.

17. The method of claim 16 further comprising:

attaching a liner extending the length of the conveyor to each of the facing side walls, the liner extending from the top of each side wall to a position at or below the level of the conveyor belt atop the carryway.

18. A belt conveyor as in claim 14 wherein the base of the at least one U-shaped pan is adjustable in width.

19. The method of claim 16 further comprising:

forming the U-shaped pan with first and second L-shaped pan sections, the first L-shaped pan section forming one of the side walls and including a base portion and the second L-shaped pan section forming the other of the side walls and including a base portion that overlaps the base portion of the first L-shaped pan section;

adjusting the overlap of the base portions to accommodate the width of the modular belt.

20. The method of claim 16 further comprising:

mounting spacers below the carryway at spaced apart locations along the length of the conveyor to provide clearance for the modular belt.

* * * * *